Figure 1:
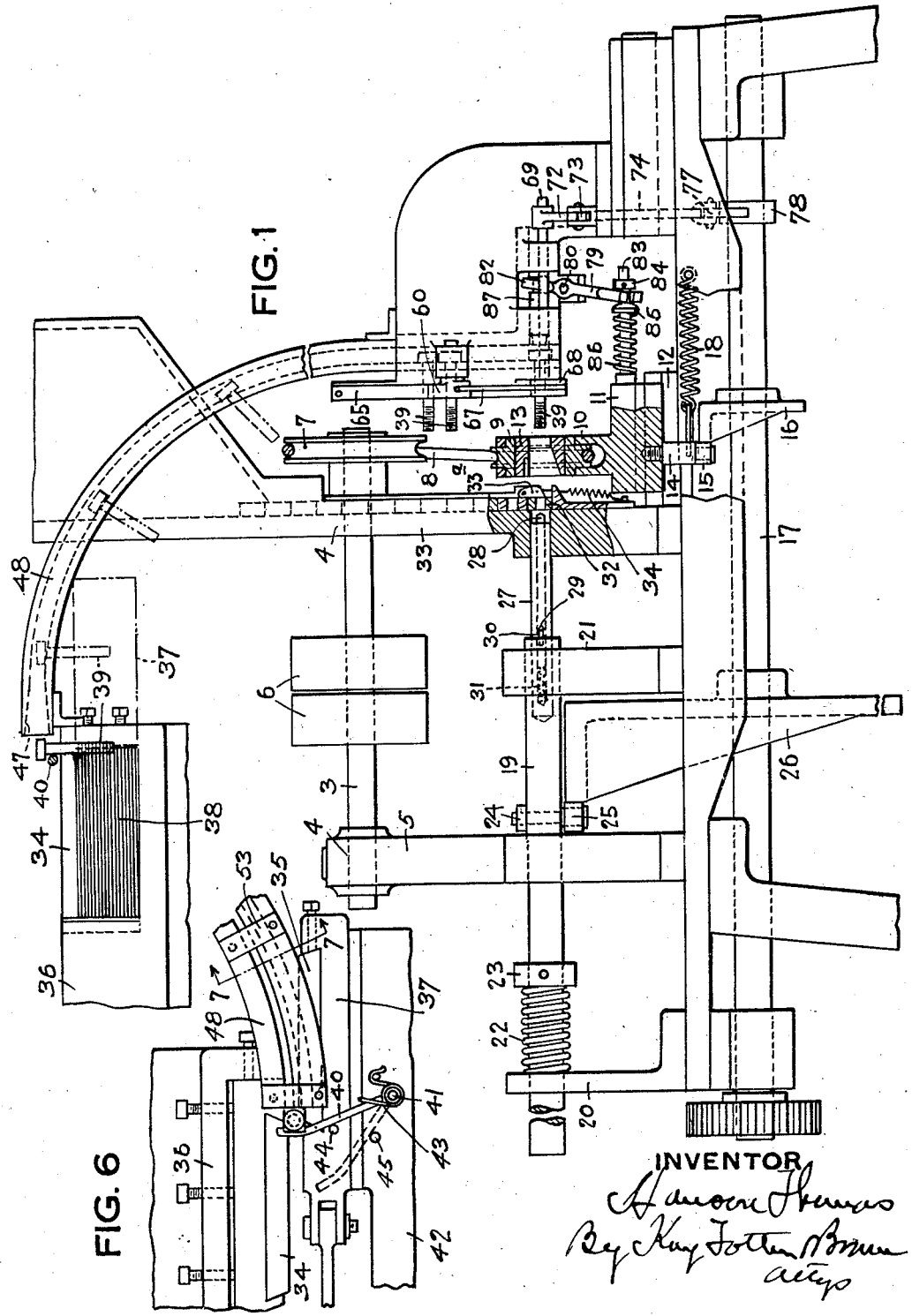

Sept. 1, 1925.
H. THOMAS
BOLT FEEDING APPARATUS
Filed March 19, 1923
1,551,591
2 Sheets-Sheet 2
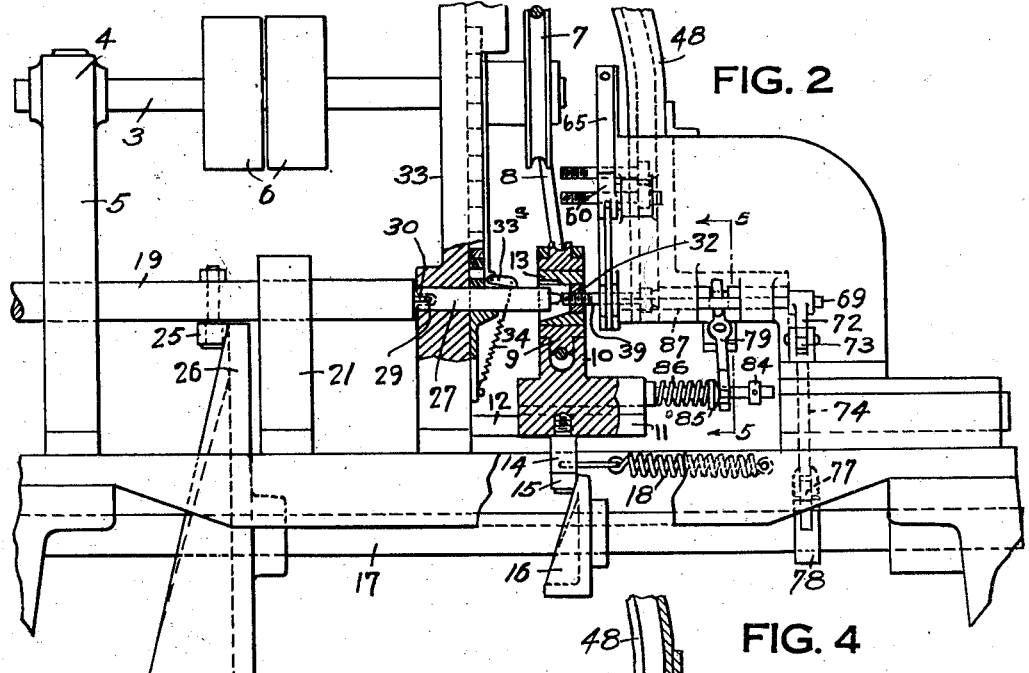
FIG. 2
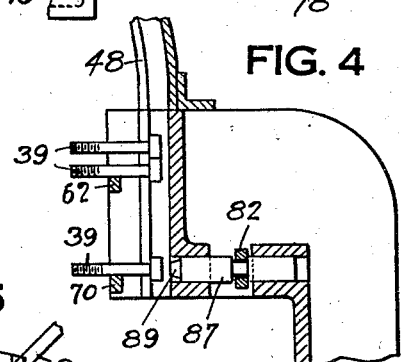
FIG. 4
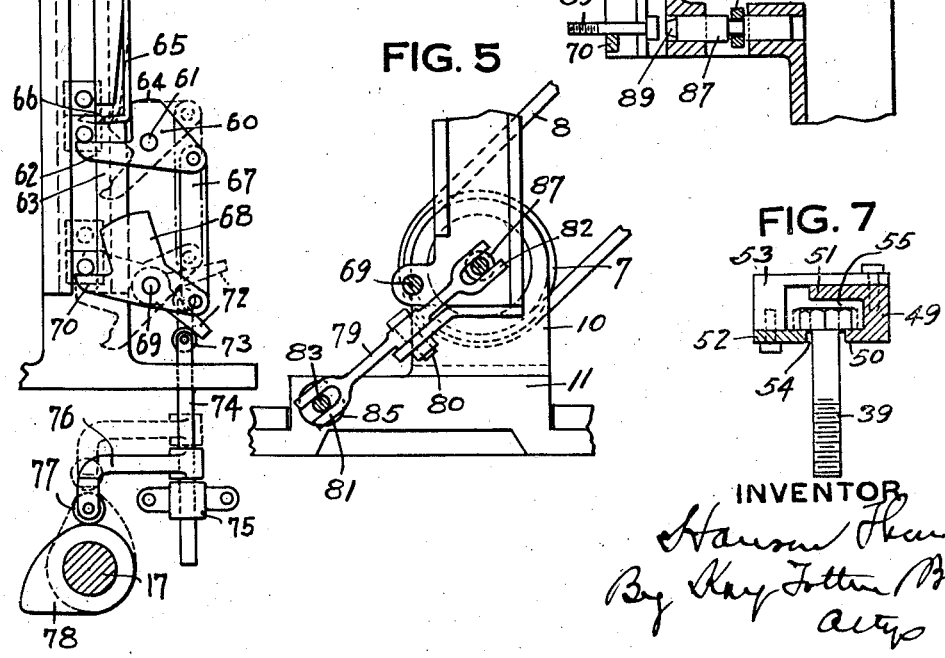
FIG. 3
FIG. 5
FIG. 7
INVENTOR
Hanson Thomas
By Kay Totten Brown
attys Patented Sept. 1, 1925.

1,551,591

UNITED STATES PATENT OFFICE.

HANSON THOMAS, OF EDGEWORTH, PENNSYLVANIA.

BOLT-FEEDING APPARATUS.

Application filed March 19, 1923. Serial No. 626,042.

*To all whom it may concern:*

Be it known that I, HANSON THOMAS, a citizen of the United States, and a resident of Edgeworth, in the county of Allegheny and State of Pennsylvania, have invented a new and useful Improvement in Bolt-Feeding Apparatus; and I do hereby declare the following to be a full, clear, and exact description thereof.

My invention relates to a machine for delivering bolts in position to be nutted, pointed, etc., thereby doing away with the manual feed heretofore generally employed.

In Letters Patent of the United States, No. 1,431,493 granted to me October 10, 1922, I have set forth and claimed a machine for applying nuts to bolts comprising, generally stated, a nut carrier with means for advancing and withdrawing same, a nut magazine in the path of movement of said carrier, a rotary nut support beyond said magazine, and means for rotating said nut support, whereby on the advance of said nut carrier the said carrier enters the opening in a nut in said magazine and delivers the same to the rotary holder, a support for the bolt, and means for bringing the nut into engagement with the bolt to screw it thereon. The present invention relates to feeding mechanism for this type of machine, and as above stated, all as will more fully hereinafter appear.

In the accompanying drawings, Fig. 1 is a side elevation, partly in section, of my improved machine; Fig. 2 is a like view partly broken away, showing the nut being applied to the bolt: Fig. 3 is a detail of the bolt-delivering mechanism: Fig. 4 is a detail of the mechanism for holding the bolt against turning when the nut is being applied: Fig. 5 is an enlarged section on the line 5—5, Fig. 2; Fig. 6 is an enlarged detail of the bolt threading mechanism and means for delivering the bolt to the feeding chute; and Fig. 7 is an enlarged sectional view of the feeding chute.

In the drawings, the numeral 2 designates a suitable bed-plate or base on which the parts composing my machine are mounted.

A shaft 3 is journaled in suitable bearings 4 in standard 5 and in part 33. Tight and loose pulleys 6 on the shaft 3 may be connected up to any suitable source of power, although it is apparent that the machine may be driven directly by an electric motor, if desired.

Mounted on the shaft 3 is the sheave 7 to receive the belt 8, said belt passing around the rotary-head 9 mounted in a bearing 10 in the slide-block 11 mounted to move back and forth in the guide 12. Fitted within the rotary-head 9 is the nut-holder 13, preferably made in two parts, and of the construction described and claimed in said Letters Patent.

To provide for the movement of the slide-block 11, said slide-block has the downwardly extending stud 14 which carries the roller 15 adapted to be engaged by the cam 16 mounted on the shaft 17 in suitable bearings in the frame, and driven in any suitable manner from the power-shaft 3.

A spring 18 is connected to the stud 14, and said spring acts to normally move said slide block 11 to the right, as shown in Fig. 2, the opposite end of the spring being connected to the frame 2.

A longitudinally movable rod 19 is mounted in guides 20 and 21 on the frame, said rod being normally moved to the right by the spring 22 interposed between the guide 20 and the collar 23 on said rod.

A pin 24 extends through the rod 19 and to the inner end of said pin is attached the roller 25 which is adapted to be engaged by the cam 26 mounted on the shaft 17, and by means of said cam the shaft 19 is withdrawn or moved to the left, as indicated in Fig. 1.

The nut-carrier 27 is connected to the rod 19. Within the nut-carrier 27 is the pin-member 28 slidable back and forth in said carrier, a transverse pin 29 connecting said pin member 28 to the carrier 27, a slot 30 being formed in said carrier to receive said pin. A spring 31 is interposed between the pin end of the carrier 27, said spring normally acting to hold the pin 29 at the forward end of the slot to allow for the yielding of said pin-member, all as set forth in said patent.

The pin-member 28 projects beyond the end of said carrier 27 to engage the nut 32 in the nut-magazine 33. A shutter 33ª at the foot of the magazine, controlled by a spring 34, acts to normally close the outlet of the magazine when the carrier is in a retracted position, as shown in Fig. 1.

My invention is adapted to be used in connection with the ordinary dies for rolling the threads on bolts, and accordingly I have illustrated such dies being mounted in die-blocks 36 and 37, respectively. Die-block 37 is adapted to reciprocate, and the faces of said dies are provided with the ordinary threading grooves 38 for forming the threads on the bolt 39 held between said dies while the movable die is reciprocated. To provide for the discharge of the bolt 39 from the dies after the thread has been formed, I provide the finger 40 which is mounted on the stud 41 on the stationary frame 42, the spring 43 being provided to retract the finger as shown in dotted lines. The finger 40 is located in the path of the stud 44 on the movable die-block 37, so that as said die-block advances it engages said finger and moves it into discharging position. A stop 45 on the frame 42 limits the backward movement of the finger 40. The threading movement of the die 37 carries the finger 40 into engagement with the bolt slightly before completion of the threading operation, thus putting the finger under tension, and at completion of the threading movement the finger ejects the bolt from the dies giving the necessary kick at the end to provide the impetus to discharge the bolt with sufficient force to enter the flared mouth 47 of the chute 48, said chute being arranged in such position with reference to said threading dies to receive the bolts therefrom and deliver them into position for receiving the nuts, as will more fully hereinafter appear.

The construction of the chute 48 is illustrated in detail in Fig. 7, said chute consisting of the angle member 49 with the inwardly extending flanges 50 and 51, and a rail 52, said rail being connected to the flange at intervals by the straps 53, to form the seat 54 to receive the shank of the bolt. In this manner the chute is open so as to permit inspection and accessible in case there should be any difficulty caused by a bolt failing to pass through.

The passage 55 in the chute which receives the head of the bolt is larger than said head so as to allow for the head taking any position in its passage through the chute, such as where it might pass through in a diagonal position.

At the lower end of the chute 48 is the bolt-magazine, said magazine being substantially similar to that illustrated and described in said Letters Patent. A stop-member 60 is pivotally mounted at 61. A finger 62 on said stop-member projects through the opening 63 into the path of the bolts to prevent the bolts from dropping. This stop-member 60 has the cam-face 64 which engages the spring-arm 65 with the inwardly projecting finger 66 adapted to enter the opening 63. A link 67 is pivotally connected to the stop-member 60, the lower end of the link being pivotally connected to the rocker 68 on the rock-shaft 69.

The rocker 68 is provided with ledge 70 to support the bolt which is to be acted on. Secured to the rocker-shaft 69 is the arm 72 which is adapted to be engaged by the roller 73 on the upper end of the rod 74, said rod being mounted in the guide 75. An arm 76 is connected to the rod 74, and said arm carries the roller 77 which is engaged by the cam 78 mounted on the shaft 17, said cam in its movement acting to elevate the rod 74 to bring the parts to the dotted line positions indicated in Fig. 3, whereby the bolts are released one at a time, all as clearly set forth in said Letters Patent.

In order to provide for the holding of the bolts against rotation while applying the nuts, I provide the following mechanism: An arm 79 is pivotally mounted to the frame at 80, said arm having the bifurcated ends 81 and 82. The lower end 81 straddles the rod 83 connected to the slide-block 11, said bifurcated end engaging said rod between the stationary collar 84 and the movable collar 85, a spring 86 being interposed between the slide block 11 and said movable collar 85.

The outer bifurcated end 82 of the arm 79 engages the pusher 87 which is mounted to slide in the frame, the inner end 89 of said pusher being in alignment with and engaging the head of the bolt to be operated, as clearly shown in Fig. 4.

What I claim is:

1. In apparatus of the character described, the combination with bolt-threading dies, one movable longitudinally with relation to the other, of means for ejecting the bolt therefrom, a chute in the path of the ejected bolt, and a support for the bolt at the opposite end of said chute.

2. In apparatus of the character described, the combination with bolt-threading dies, one movable longitudinally with relation to the other, of an ejecter in the path of the movable die, a chute in the path of the ejected bolt, and a bolt support at the opposite end of said chute.

3. In apparatus of the character described, the combination with bolt-threading dies, one movable longitudinally with relation to the other, of a spring actuated ejector finger in the path of the movable die, a chute in the path of the ejected bolt, and a bolt support at the opposite end of said chute.

4. In apparatus of the character described, the combination with bolt-threading dies, one movable with relation to the other, of a spring actuated finger, a projection on the movable die adapted to engage said finger, a chute in the path of the ejected bolt and a bolt support at the opposite end of said chute.

5. In apparatus of the character described, the combination with bolt-threading dies, one movable with relation to the other, of means for ejecting the bolt therefrom, a chute in the path of the ejected bolt comprising an angle member with upper and lower inwardly projecting flanges, the lower flange having a slot formed therein for the passage of the shank of the bolt, strap members secured at intervals to the flanges of said angle member, and forming a passage with said angle member for the head of the bolt larger than the diagonal dimensions of said head, and a bolt-support at the inner end of said chute.

6. In apparatus of the character described, the combination with bolt-threading dies, one movable with relation to the other, of means for ejecting the bolt therefrom, a chute in the path of the ejected bolt, a support at the opposite end of said chute, and means yieldable longitudinally of the bolt for engaging the head thereof to hold it against rotary movement while in said support.

In testimony whereof I, the said HANSON THOMAS, have hereunto set my hand.

HANSON THOMAS.